United States Patent
Hickner et al.

[15] 3,704,043
[45] Nov. 28, 1972

[54] ADAPTIVE BRAKING CONTROL SYSTEM

[72] Inventors: George B. Hickner; Donald W. Howard; Paul S. Houseman, all of South Bend, Ind. Ralph W. Carp, Baltimore, Md.

[73] Assignee: The Bendix Corporation

[22] Filed: Sept. 10, 1970

[21] Appl. No.: 70,979

[52] U.S. Cl. ............... 303/21 BE, 188/181 A, 303/20
[51] Int. Cl. ............................................. B60t 8/12
[58] Field of Search ............... 188/181 A; 303/20, 21; 324/162; 340/262

[56] References Cited

UNITED STATES PATENTS

| | | | |
|---|---|---|---|
| 3,556,610 | 1/1971 | Leiber | 303/21 P |
| 3,547,501 | 12/1970 | Harned et al. | 303/21 BE |
| 3,574,417 | 4/1971 | Howard et al. | 303/21 BE |
| 3,499,689 | 3/1970 | Carp et al. | 303/21 P |
| 3,525,553 | 8/1970 | Carp et al. | 303/21 P |

FOREIGN PATENTS OR APPLICATIONS

| | | | |
|---|---|---|---|
| 1,914,765 | 10/1970 | Germany | 303/21 BE |
| 1,914,114 | 10/1970 | Germany | 303/21 BE |

*Primary Examiner*—Milton Buchler
*Assistant Examiner*—Stephen G. Kunin
*Attorney*—William N. Antonis and Plante, Hartz, Smith & Thompson

[57] ABSTRACT

An anti-skid control system for operating inlet and outlet valves of a pressure modulator. The control system uses the rate of change of rotational velocity of the wheels to give an acceleration or deceleration signal. After given acceleration or deceleration rates have been exceeded, the appropriate valve is variably pulsed to give brake pressure build and decay rates that are directly proportioned to wheel acceleration or deceleration. A deceleration responsive switch is used to vary the length of the pressure decay cycle to account for varying coefficients of friction. A delay prevents an initial deceleration rate from operating the valves unless the deceleration rate still exists after a time period.

7 Claims, 3 Drawing Figures

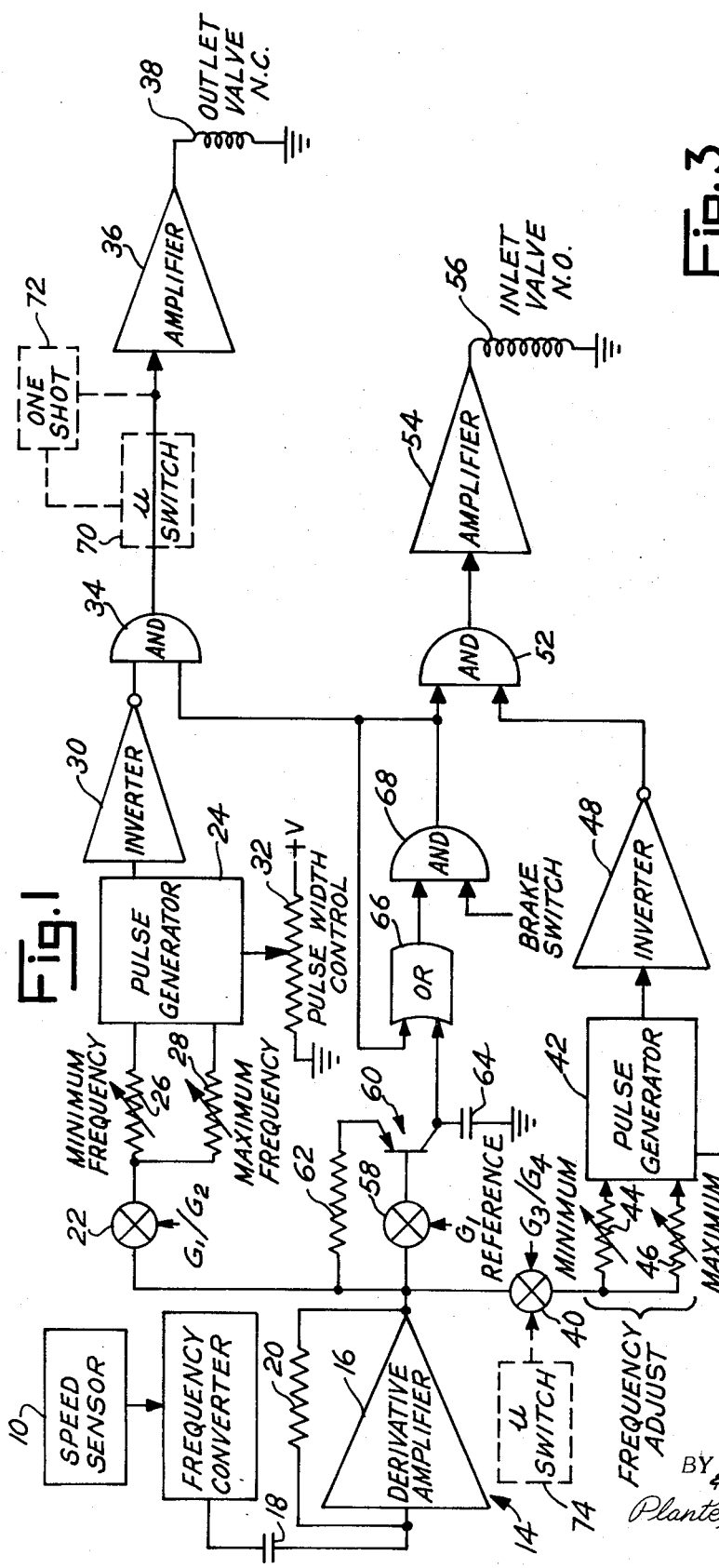
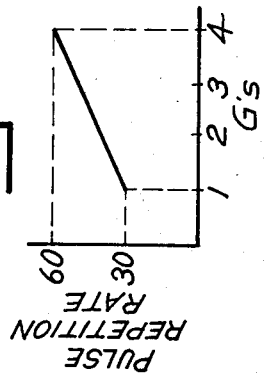
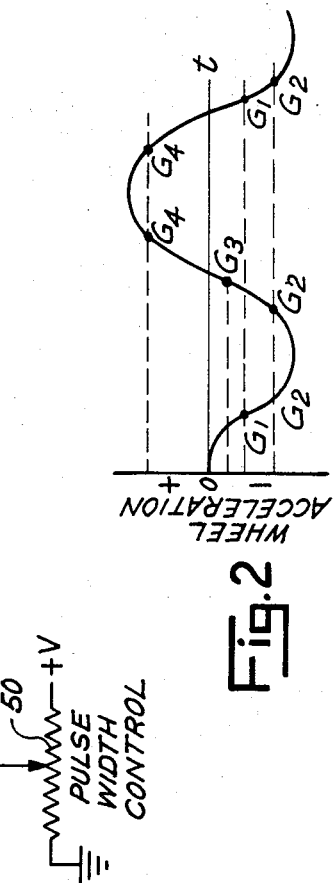

ADAPTIVE BRAKING CONTROL SYSTEM

BACKGROUND OF THE INVENTION

This invention relates to a control system for use in the adaptive braking of an automotive vehicle. The control system operates inlet and outlet valves of a modulator that are used to vary the brake pressure.

Previous to this invention, control systems have been utilized to operate inlet and outlet valves of a modulator. However, the inlet or outlet valves were switched to a given position and remained in that position until a given rate of acceleration or deceleration was obtained. After this given rate of acceleration or deceleration was obtained, then one or both of the valves would be switched to further change the rate of acceleration or deceleration. Once the given rate of acceleration or deceleration was reached, there was no relatively linear relationship between the amount of flow in the modulator and the rate of change of rotational velocity (acceleration or deceleration) of the vehicle wheel. It was not until a second acceleration or deceleration rate of change was reached that the previous control system could vary the positions of the inlet or outlet valves.

The present invention is a pulse modulation of the inlet and outlet valves to slowly vary the amount of flow in the modulator as a direct relation to the rate of change of the rotational velocity of the vehicle wheel. The present control system will show a method whereby the inlet valve and outlet valve may each be pulse modulated when corresponding rates of change of the rotational velocity of the vehicle wheels has been obtained. Also, the present invention will illustrate how one of the valves for the modulator may be pulse modulated with the other valve not having the pulse modulation feature. Also, the length of time for the operation of one of the cycles can be varied by a deceleration responsive means.

SUMMARY OF THE INVENTION

It is the object of this invention to provide an adaptive braking control system for pulse modulating the inlet and outlet valves of a modulator in an adaptive braking system.

It is a still further object of this invention to provide a control system that utilizes rates of change of the rotational velocity of a vehicle wheel, to linearly vary the pulse modulation of either the outlet valve or the inlet valve.

It is a still further object of this invention to prevent the operation of the inlet and outlet valves unless a predetermined rate of change of the rotational velocity of vehicle wheel still exists after a given time period.

It is an even further object of this invention to vary the operation of one of the valves to the modulator in response to changes in coefficient of friction between the vehicle wheel and the road surface.

It is another object of this invention to sense the rotational velocity of the vehicle wheel, and take the derivative thereof to give the deceleration of the vehicle wheel. When a given level of deceleration has been exceeded, if this given level of deceleration still exists after a trial interval, both an inlet and outlet valve of a modulator in an adaptive braking system will be activated. The inlet valve will be closed all the time and the outlet valve will be pulsed at a higher frequency as the deceleration of the vehicle wheel continues to rise. Once the braking pressure has been sufficiently reduced to start the wheel accelerating, and a given level of acceleration has been exceeded, then the outlet valve will be closed and the inlet valve will be pulsed open at a rate directly proportional to further increases in wheel acceleration. After sufficient pressure has been returned to stop wheel acceleration and start the wheel to decelerate and the previously mentioned deceleration point has again been exceeded, the cycle will repeat itself.

BRIEF DESCRIPTION OF THE DRAWINGS

FIG. 1 is an illustrative block diagram of the control system.

FIG. 2 is a graph of wheel acceleration versus time to illustrate the acceleration and deceleration set points.

FIG. 3 is a graph of the typical pulse repetition rate versus units of acceleration or deceleration.

DESCRIPTION OF THE PREFERRED EMBODIMENT

Referring to FIG. 1, the reference numeral 10 designates a wheel speed sensor that is used to detect the rotational velocity of vehicle wheel and generate a pulsed output that is directly related to the rotational velocity. The pulsed output of the speed sensor 10 is converted in frequency converter 12 from a pulse signal into an analog signal with the output of the frequency converter being directly related to the number of output pulses from the wheel speed sensor 10. To get the rate of change of the rotational velocity of the vehicle wheel, a derivative amplifier represented generally by reference numeral 14 takes the derivative of the analog output from frequency converter 12. The derivative amplifier 14 consists of operational amplifier 16, input capacitance 18 and bypass resistance 20. The input capacitance 18 and the bypass resistance 20 form the derivative network. The output of the derivative amplifier 14 corresponds to the rate of change of rotational velocity (acceleration or deceleration) of the vehicle wheel.

Referring jointly between FIGS. 1 and 2, one can see how the rate of change, or deceleration, of a vehicle wheel is compared with a pre-selected acceleration or deceleration point for the vehicle wheel. For the purposes of this application, when wheel acceleration has a negative value, it is the same as wheel deceleration.

The output of the derivative amplifier 14 is fed into three comparators. In comparator 22, if the output of the derivative amplifier 14 exceeds a predetermined value G1, then comparator 22 will have an output. This output is a linear increasing voltage between wheel deceleration rates G1 and G2 as shown in FIG. 2. At the lower voltage from comparator 22, pulse generator 24 is pulsed at a minimum frequency determined by variable resistor 26. As the output of comparator 22 increases to its maximum level at G2, the pulse generator increases in frequency from its minimum to its maximum frequency as determined by variable resistor 28. It has been assumed that the output from the pulse generator 24 is a constant voltage level when no signal is received from comparator 22. Therefore, an inverter 30 has been included to give an output that is at a zero level and pulsed at a minimum frequency when a G1 reference level has been obtained, and pulsed at a maximum frequency when a G2 reference level has been obtained, and is linearly variable therebetween. The width of the pulse from pulse generator 24 is determined by a pulse width control resistor 32 connected between ground and a voltage source +V. When the G2 deceleration rate has been exceeded, the pulse generator 24 is being pulsed at such a frequency that gives a continuous output voltage from inverter 30. It is possible to use a given frequency and vary the pulse width to obtain the same results.

The pulsed output from converter 30 is fed through inhibit AND gate 34 to an amplifier 36 to energize the coil 38 of the outlet valve of a pressure modulator. The outlet valve is a normally closed valve.

Simultaneously with the previously described operation of the normally closed outlet valve, the acceleration signal from the derivative amplifier 14 is being compared in comparator 40 to a G3 acceleration set point. If the acceleration signal exceeds the G3 set point then a voltage output from comparator 40 will be generated. A pulse generator 42 receives a voltage output from comparator 40 which varies linearly between the G3 reference point and a G4 reference point shown in FIG. 2. The normal output from the pulse generator 42 is at a constant voltage level. When comparator 40 reaches the G3 set point, the pulse generator 42 begins to pulse off at a minimum frequency determined by variable resistor 44. As the voltage output of comparator 40 increases from the G3 to the G4 set point, the pulse generator 42 is pulsed off at an increasing frequency with the maximum frequency, which is determined by the variable resistor 46, corresponding to the G4 set point. When G4 is reached, the pulse generator 42 has a continuous output voltage of zero. Since it was assumed that the pulse generator output is at a voltage level with no voltage input, inverter 48 is necessary to invert the output from zero to a voltage level or vice versa. If the output of the pulse generator 42 was zero for no voltage input, inverter 48 would not be necessary. The pulse width of the output from the pulse generator 42 is controlled by pulse width control resistor 50 which is connected between ground and a voltage source +V.

The output of inverter 48 is fed into inhibit AND gate 52 which, if the other signal, as will be subsequently described, has been received, then an output voltage from inhibit AND gate 52 is fed into amplifier 54 which operates the coil 56 of a normally open solenoid inlet valve for a pressure modulator in an adaptive braking system.

During an initial brake application, the output of the derivative amplifier 14 is fed into a G1 reference comparator 58 which, if the G1 reference point has been exceeded in the deceleration direction, then an output voltage will switch transistor 60 to the conducting state. Current flows through resistor 62, transistor 60 and charging capacitor 64. Upon receiving a predetermined amount of charge by charging capacitor 64, a sufficient voltage will be realized on the input to OR gate 66 to give an output therefrom. The resistor 62 and capacitor 64 may be selected so that any predetermined charge time may be obtained for a given deceleration above G1. The greater the deceleration above G1, the shorter the charge time of capacitor 64 because the output voltage of derivative amplifier 14 will be greater. The output of OR gate 66 feeds into AND gate 68 along with the brake switch. The brake switch is a switch that is connected to the brake pedal so that upon application of the vehicle brakes, a voltage signal will be received by AND gate 68.

The output of the AND gate 68 is fed back into OR gate 66 to form a latching network. Therefore, after an application of the vehicle brakes whereby a signal is received from the brake switch and OR gate 66, a positive voltage output will be realized from AND gate 68 until the brakes have been released. The delay formed by resistor 62 and charging capacitor 64 and inversely proportional to the deceleration prohibits an initial output from AND gate 68 unless an output has been received from OR gate 66. This reduces the noise problem in an adaptive braking system. An output from derivative amplifier 14 that exceeds the G1 reference point must continue for a predetermined period of time before an output from AND gate 68 will be realized.

Also, it should be noted that the output of AND gate 68 is used to control the output signals from inhibit AND gates 34 and 52. Therefore, until a signal is received from AND gate 68, the inhibit AND gates 34 and 52 cannot have a voltage output, thus preventing the operation of the outlet valve and inlet valve 38 and 56, respectively.

Referring now to FIG. 3, there is shown a typical example of the pulse repetition rate of a pulse generator 42 or 24 versus some G acceleration or deceleration rate in feet per second square. The reason for the use of 30 pulses per second as the minimum frequency and 60 pulses per second as the maximum frequency is due to the physical limitations normally realized in the braking system. The minimum and maximum rates of 30 and 60 cycles per second, respectively, was found to be extremely suitable in a full power hydraulic system. However, other minimum and maximum frequencies will probably be required in other types of adaptive braking systems.

As a typical example of the operation of the outlet valve and the inlet valve of a pressure modulator, attention is directed to the table given below. This table refers to cycles after the first cycle when the time delay formed by resistors 62 and capacitor 64 no longer applies.

TABLE I

| Acceleration Level | Inlet Valve Normally Open | Outlet Valve Normally Closed |
|---|---|---|
| G1 | Closed | Minimum pulse open |
| G1 to G2 | Closed | Minimum to maximum Pulse Open |
| G2 | Closed | Open |
| G2 to G1 | Closed | Maximum to minimum Pulse Open |
| G1 to G3 | Closed | Closed |
| G3 | Minimum Pulse Open | Closed |
| G3 to G4 | Minimum to Maximum Pulse Open | Closed |
| G4 | Open | Closed |
| G4 to G3 | Maximum to Minimum Pulse Closed | Closed |
| G3 to G1 | Closed | Closed |
| G1 | Closed | Minimum pulse open |
| REPEAT CYCLE | | |

Experimentation with the previously described control system led to the conclusion that because generator 24, along with its associated resistors 26, 28, 32 and inverter 30, could be excluded from the circuit, and thereby operating the outlet valve by energizing coil 38 directly from the G2 reference point received from comparator 22. With this modification, the inlet valve and its associated coil 56 could be pulsed, but the outlet valve and its associated coil 38 could not be pulsed. To further include an acceleration responsive device that would account for the changes of coefficient between road surface and the vehicle wheel, an acceleration control switch 70 and a one shot timer 72 may be inserted between inhibiting AND gate 34 and amplifier 36. The acceleration control switch 70 is more fully described in U.S. Pat. application No. 763,702 filed on Sept. 30, 1968 now U.S. Pat. No. 3,525,553 and having a common assignee as the present invention. The acceleration control switch 70 operates in the following manner. The switch 70 assumes that the vehicle is operating on a low coefficient surface. Therefore, the one shot timer 72 keeps the outlet valve 38 energized for a predetermined time period. A delay time can be used, where necessary, between outlet valve closing (de-energization) and inlet valve opening (de-energization). This allows for a further decrease in pressure before a subsequent pressure can start reapplying the brakes. However, if upon applying brakes the acceleration control switch 70 indicates that the vehicle is on a high coefficient surface, then the one shot 72 will be eliminated by a short circuit. Therefore, there would be no delay in the operation of the outlet valve through its respective coil 38. In utilizing the acceleration control switch 70 and the one shot timer 72 in the manner just described, it may be necessary in some braking systems to include a delay to prohibit an output from inhibit AND gate 52 for a short time period. This is due to resonant conditions that exist during the initial opening of the outlet valve by coil 38 which could cause an oscillating fluid pressure.

Another method of compensating for changes in the coefficient friction between the road surface and the tire of the vehicle is shown by including an acceleration responsive switch 74, as was previously described in U.S. Pat. application No. 736,702, to change the set point of comparator 40. The acceleration control switch 74 feeds into comparator 40 for varying the G3 set point as a function of the coefficient of friction between the vehicle and the road surface. The acceleration control switch 74 assumes that the vehicle is operating on a low coefficient surface. However, if upon application of the brake a high coefficient friction between the vehicle wheel and the road surface is realized, then the G3 set point will be changed in the deceleration direction along the curve plotted in FIG. 2. However, if a later low coefficient surface is realized during the same brake application, the G3 set point will change along the curve in the positive acceleration direction. By moving G3 in the decelerational direction which corresponds to a high coefficient surface, the inlet valve is closed a shorter length of time. By moving G3 in the acceleration direction, which corresponds to a high coefficient surface, the inlet valve is closed longer. Though the application varied the G3 set point, other set points could be varied to compensate for changing coefficients of friction and still be within the scope of the present invention.

We claim:

1. In a vehicle adaptive braking system for relieving braking pressure in the brake of a controlled vehicle wheel to prevent said controlled wheel from locking;
   means for generating a first signal proportional to the acceleration and deceleration of said controlled wheel;
   first comparing means generating a second signal when the magnitude of said first signal exceeds a first reference value;
   first pulse generating means generating a pulsed output signal at a frequency proportional to the magnitude of said second signal, said pulse generating means producing a substantially constant output signal when the magnitude of said second signal exceeds a second reference value;
   outlet valve means responsive to the pulsed output signal of said first pulse generating means to sequentially open and close communication from said brake to thereby decay braking pressure at a rate proportional to the frequency of said pulsed output signal, said outlet valve means being responsive to said constant output signal to decay braking pressure at a substantially constant rate;
   timing means generating an output signal a predetermined time period after actuation of said timing means;
   second comparing means generating an output signal actuating said timing means when said first signal exceeds said first reference value;
   gating means preventing operation of said outlet valve means until both said timing means and said pulse generating means produce an output signal.
2. The invention of claim 1; and
   switch means actuated when the vehicle operator effects a brake application;
   said gating means including means inhibiting operation of said outlet valve means until actuation of said switch means.
3. The invention of claim 2; and
   latching means transmitting a signal to said gating means after said timing means generates an output signal until said switch means is deactivated.
4. The invention of claim 1; and
   means responsive to vehicle deceleration delaying actuation of said outlet valve means when the vehicle decelerates at a lesser rate but permitting immediate actuation of said outlet valve means when said vehicle is decelerated at a greater rate.
5. The invention of claim 1; and
   third comparing means generating a third output signal when the magnitude of said first signal exceeds a third reference value;
   second pulse generating means generating a pulsed output signal at a frequency proportional to the magnitude of said third output signal, said pulse generating means producing a substantially constant output signal when the magnitude of said third output signal exceeds a fourth reference value;
   inlet valve means responsive to the pulsed output of said second pulse generating means to sequentially open and close communication into said brake, said inlet valve means being responsive to said substantially constant output signal of said second pulse generating means to continuously actuate said inlet valve means.

6. The invention of claim 5;
said gating means preventing operation of said normally open inlet valve means until both said timing means and said pulse generating means produces an output signal.

7. The invention of claim 5; and
means for varying the width of the pulses generated by said first and second pulse generating means.

\* \* \* \* \*